(12) United States Patent
Flynn et al.

(10) Patent No.: US 12,129,940 B2
(45) Date of Patent: Oct. 29, 2024

(54) MECHANICAL ORIENTATION CONTROL HEATER HOSE ASSEMBLY FOR QUICK CONNECT

(71) Applicant: Hanon Systems, Daejeon (KR)

(72) Inventors: Patty Flynn, El Paso, TX (US); Eric Kesler, Northville, MI (US); Augustin Machynak, Senov u Noveho Jicina (CZ); Radek Macicek, Novy Jicin (CZ)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/804,666

(22) Filed: May 31, 2022

(65) Prior Publication Data

US 2022/0290788 A1   Sep. 15, 2022

Related U.S. Application Data

(62) Division of application No. 17/167,186, filed on Feb. 4, 2021, now Pat. No. 11,754,206.

(60) Provisional application No. 62/988,016, filed on Mar. 11, 2020, provisional application No. 62/987,446, filed on Mar. 10, 2020.

(51) Int. Cl.
| | |
|---|---|
| *F16L 13/14* | (2006.01) |
| *B23P 11/00* | (2006.01) |
| *F16L 33/207* | (2006.01) |
| *F16L 37/10* | (2006.01) |
| *F16L 37/113* | (2006.01) |

(52) U.S. Cl.
CPC ........... *F16L 13/141* (2013.01); *B23P 11/005* (2013.01); *F16L 13/147* (2013.01); *F16L 33/2075* (2013.01); *F16L 37/101* (2013.01); *F16L 37/113* (2013.01)

(58) Field of Classification Search
CPC ..... F16L 13/141; F16L 13/146; F16L 13/147; F16L 13/142; F16L 13/143; F16L 13/161; F16L 13/163; F16L 13/165; F16L 33/2075; F16L 37/0985
USPC .......................................................... 285/382
See application file for complete search history.

(56) References Cited

U.S. PATENT DOCUMENTS

| | | | |
|---|---|---|---|
| 4,042,262 A | 8/1977 | Mooney et al. | |
| 4,682,798 A | 7/1987 | Sauer | |
| 4,832,380 A | 5/1989 | Oetiker | |
| (Continued) | | | |

FOREIGN PATENT DOCUMENTS

| | | |
|---|---|---|
| DE | 3323640 A1 | 1/1984 |
| DE | 102017209579 A1 | 12/2018 |
| (Continued) | | |

*Primary Examiner* — Zachary T Dragicevich
(74) *Attorney, Agent, or Firm* — Shumaker, Loop & Kendrick, LLP; James D. Miller

(57) ABSTRACT

An end-form fitting includes a tube and an auxiliary component disposed around the tube. One of the tube and the auxiliary component is deformed to cause the auxiliary component to engage the tube in order to militate against relative movement between the tube and the auxiliary component. The auxiliary component includes an array of surface irregularities formed therein and configured to engage an outer circumferential surface of the tube to form a corrugated joint therebetween. The auxiliary component is formed to include a radially outwardly extending orientation structure for establishing a rotational orientation of the end-form fitting when being coupled to a complimentary end-form fitting.

12 Claims, 7 Drawing Sheets

(56) References Cited

U.S. PATENT DOCUMENTS

| | | |
|---|---|---|
| 5,769,465 A | 6/1998 | Schultz et al. |
| 2013/0277960 A1 | 10/2013 | Neal et al. |
| 2016/0047501 A1 | 2/2016 | Kawahara et al. |

FOREIGN PATENT DOCUMENTS

| | | | |
|---|---|---|---|
| JP | 2001065768 A | 3/2001 | |
| JP | 3669222 B2 | 7/2005 | |
| WO | WO-2014167614 A1 * | 10/2014 | ............ F16L 13/146 |

* cited by examiner

MECHANICAL ORIENTATION CONTROL HEATER HOSE ASSEMBLY FOR QUICK CONNECT

CROSS-REFERENCE TO RELATED APPLICATIONS

This is a divisional patent application of U.S. patent application Ser. No. 17/167,186 which claims priority to U.S. Provisional Patent Application Ser. No. 62/987,446 filed on Mar. 10, 2020 and U.S. Provisional Patent Application Ser. No. 62/988,016 filed on Mar. 11, 2020, the entire disclosures of which are hereby incorporated herein by reference.

FIELD OF THE INVENTION

The invention relates generally to a quick-connect end-form fitting for a tube and a method for manufacturing the same, and particularly to a method and apparatus for a quick-connect end-form fitting having an orientation control feature.

BACKGROUND

The hoses or tubes used in automotive applications are often coupled at their respective ends to various different components of the associated fluid system via the use of quick-connect end-form fittings. Such quick-connect end-form fittings typically consist of a male component provided by an end portion of the hose or tube and a corresponding female component configured to receive the end portion of the hose or tube. The female component is generally provided as a housing having an interior opening defining a mating end-form geometry (for example Society of Automotive Engineers/SAE or German Association of the Automotive Industry/VDA style tube end-forms) for receiving the end portion of the hose or tube, a radial sealing O-ring disposed within the interior opening for making sealing contact with the end portion of the hose or tube, and a locking feature for releasably locking an axial position of the end portion of the hose or tube within the interior opening following contact of the end portion with the sealing O-ring.

The locking feature may be a snap-fit connection or other releasable connection configured to allow for axial entry of the end portion of the hose or tube into the hollow interior in a first axial direction before then preventing removal of the end portion in an opposing second axial direction. The locking feature may be formed by a radially inwardly projecting structure that resiliently deforms radially outwardly when engaging and passing by a collar, flange, or other radially outwardly projecting feature formed in the end portion of the hose or tube, such as a barb-shaped flange or an annular rib, before then snapping back radially inwardly around a distal end of the radially inwardly projecting structure, thereby preventing undesired axial removal of the hose or tube from the interior opening. The locking feature may further include a release feature for disengaging the projecting feature of the end portion from the locking feature when axial removal of the hose or tube from the female component is desired, such as by urging the locking feature back into the radial outward direction via operator interaction therewith to allow for axial passage of the projecting feature of the end portion back past the locking feature.

However, several issues exist for the current technology. First, orientation of the hose or tube is not ensured and assembly line operators may install the hose or tube at any rotation angle which may result in an incorrect and undesired orientation present between the cooperating male and female components. Second, inlet connectors and outlet connectors are typically the same size and general configuration. As a result, such connectors may be improperly installed in place of one another, which can facilitate poor connections. Finally, the hose or tube is typically allowed to rotate about the finished connection following the sealing engagement with the sealing O-ring. This rotation may lead to premature wear of the sealing O-ring and eventual leakage from the end fitting assembly.

Accordingly, there exists a need in the art for a quick connect end-form fitting for a hose or tube having an easily manufactured and cost effective orientation control feature for preventing misalignment and rotation of the quick connect end-form fitting when in an assembled configuration.

SUMMARY

Consistent and consonant with the instant disclosure, a quick-connect end-form fitting having an orientation control feature and method of producing the same has surprisingly been invented.

According to an embodiment of the present invention, the end-form fitting comprises a tube and an auxiliary component disposed around the tube. One of the tube or the auxiliary component is deformed to cause the auxiliary component to engage the tube.

A method of manufacturing the end-form fitting is also disclosed. The method includes the steps of positioning an annular auxiliary component around a tube and deforming one of the tube or the auxiliary component to cause the auxiliary component to engage the tube.

BRIEF DESCRIPTION OF THE DRAWINGS

The above-mentioned, and other features and objects of the invention, and the manner of attaining them, will become more apparent and the invention itself will be better understood by reference to the following descriptions of embodiments of the invention taken in conjunction with the accompanying drawings, wherein.

DETAILED DESCRIPTION OF THE INVENTION

Figure 1:
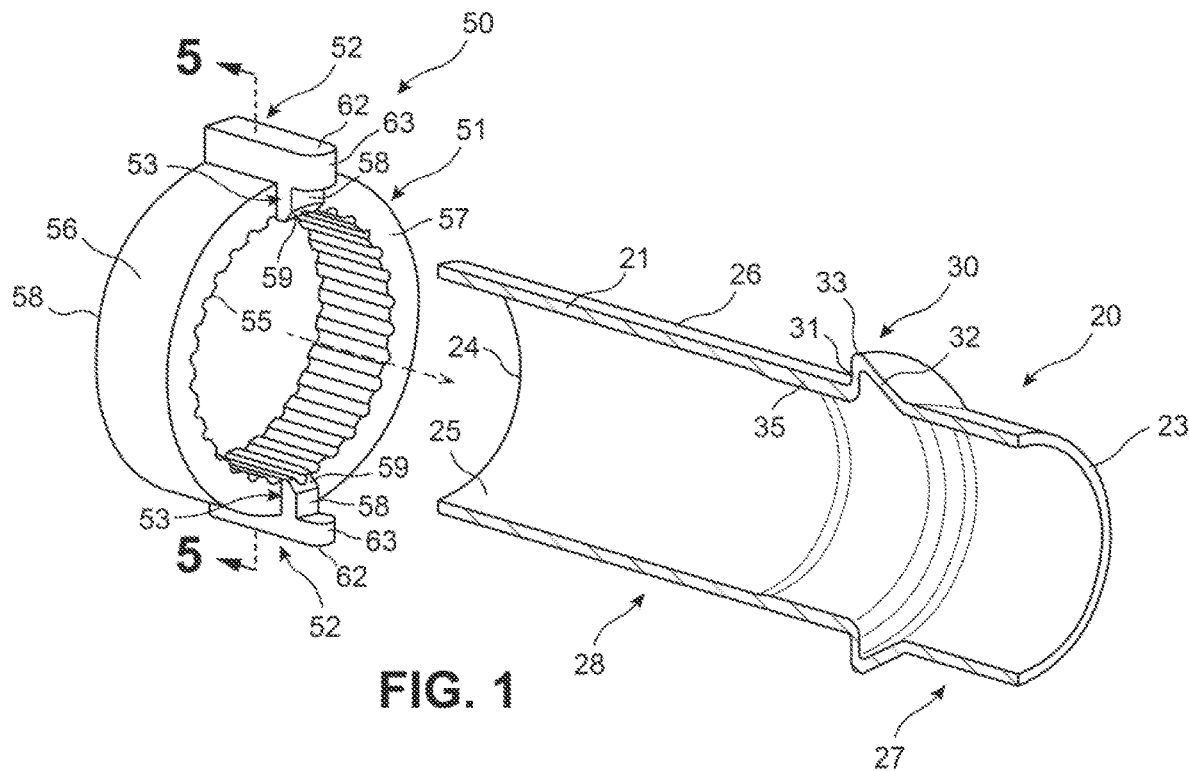
FIG. 1 is an exploded and partial cross-sectional perspective view of a tube and an axially spaced apart auxiliary component utilized in forming a quick-connect end-form fitting according to an embodiment of the present invention, wherein the partial cross-sectional view includes half of the tube removed to illustrate an interior thereof.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-7 illustrate a method of manufacturing a quick-connect end-form fitting 10 according to an embodiment of the present invention. The quick-connect end-form fitting 10 is referred to as the fitting 10 hereinafter for brevity. The fitting 10 forms a component of a fitting assembly 80 configured to couple an end portion of a hose or tube to another component of an associated fluid system. The fitting assembly 80 includes the fitting 10 acting as a male component configured for releasable and fluid-tight coupling to a corresponding female component 82. Although described herein as being suitable for automotive applications, it should be understood that the fitting 10 and the corresponding fitting assembly 80 may be utilized with any type of fluid system requiring a fluid-tight seal at the connection of two different fluid conveying structures of the fluid system. The fitting assembly 80 may be especially useful in situations wherein an ease of releasing the fluid-tight connection between the fitting 10 and the female component 82 is desired due to the quick-connect and quick-disconnect features associated with the fitting assembly 80.

The fitting 10 is formed by a tube 20 and an auxiliary component 50 securely coupled to the tube 20 according to a method of the present invention. The tube 20 may alternatively be referred to as a hose, conduit, or the like, as desired. The tube 20 may be representative of any fluid conveying structure of the corresponding fluid system utilizing the fitting assembly 80. The auxiliary component 50 provides an orientation feature of the fitting 10 configured to aid in rotationally orienting the fitting 10 relative to the female component 82 of the fitting assembly 80 when the fitting 10 is axially received within the female component 82. The auxiliary component 50 may also cooperate with a flanged portion 30 of the tube 20 in forming a male locking feature configured for releasable coupling to a corresponding female locking feature of the female component 82.

The tube 20 may be initially provided as an elongate cylindrical structure defined by a circumferential wall 21. The circumferential wall 21 extends longitudinally from a first end 23 of the tube 20 to an opposing second end 24 thereof. As used herein, the first end 23 is alternatively referred to as the front end 23 of the tube 20 due to the manner in which the front end 23 is the leading end of the tube 20 when received axially within the auxiliary component 50. Similarly, the second end 24 is alternatively referred to as the rear end 24 of the tube 20. The rear end 24 of the tube 20 may be coupled to another segment of a hose, tube, or conduit (not shown) while the front end 23 of the tube 20 is configured for reception within the female component 82 as a result of an axially forward movement of the fitting 10 relative to the female component 82 of the corresponding fitting assembly 80.

An axial direction of the tube 20 coincides with the longitudinal direction thereof as defined between the front and rear ends 23, 24 thereof. Additionally, a central axis of the auxiliary component 50 and a central axis of the fitting 10 also coincide with a central axis of the tube 20, hence any references to an axial direction of any of the fitting 10, the tube 20, or the auxiliary component 50 all refer to the longitudinal direction of the tube 20. As used herein, a forward axial direction refers to an axial direction of the fitting 10 extending from the rear end 24 of the tube 20 towards the front end 23 thereof while a rearward axial direction refers to an axial direction of the fitting 10 extending from the front end 23 of the tube 20 towards the rear end 24 thereof. Further references to a radial direction of any of the fitting 10, the tube 20, and the auxiliary component 50 refer to those directions arranged perpendicular to and passing through the central axis shared by each of the fitting 10, the tube 20, and the auxiliary component 50.

The circumferential wall 21 defines an inner circumferential surface 25 and an oppositely arranged outer circumferential surface 26. The inner circumferential surface 25 defines a flow opening through the tube 20 while the outer circumferential surface 26 is configured for engagement with the auxiliary component 50 and corresponding structure of the female component 82 when the fitting assembly 80 is in a coupled configuration. The circumferential wall 21 may be provided to initially include a constant cross-sectional shape from the front end 23 to the rear end 24 thereof with each of the surfaces 25, 26 having a constant circular shape.

The tube 20 may initially be provided as a raw cylindrical structure that is initially deformed to the configuration of the tube 20 as shown in FIG. 1. Specifically, the deforming of the tube 20 may include the introduction of the flanged portion 30 into the tube 20. The flanged portion 30 is disposed at an axial position on the tube 20 spaced apart from the front end 23 thereof to divide the tube 20 axially into a front portion 27 disposed between the front end 23 and the flanged portion 30 and a rear portion 28 disposed between the rear end 24 and the flanged portion 30. Any desired tube forming process may be utilized to form the flanged portion 30, including expanding the tube 20 radially outwardly via a radially outwardly directed force applied to the inner circumferential surface 25 from the interior of the tube 20. However, any forming process or operation may be utilized to deform the otherwise cylindrical tube 20 to include the flanged portion 30, as desired, so long as the tube 20 is deformed to include the features for interacting with the auxiliary component 50 as described hereinafter.

The flanged portion 30 extends annularly around the circumferential wall 21 and projects radially outwardly away from the adjacent front and rear portions 27, 28 of the tube 20. In the provided embodiment, the flanged portion 30 is shown as having a triangular or V-shaped cross-section including a radial segment 31 intersecting a tapered segment 32 at a radially outermost disposed tip 33 of the flanged portion 30. The radial segment 31 projects radially outwardly from a front end of the rear portion 28 and the tapered segment 32 projects radially outwardly from a rear end of the front portion 27 with an outer diameter of the tapered segment 32 increasing when progressing axially towards the tip 33 of the flanged portion 30. The radial segment 31 is arranged transverse to the axial direction of the tube 20 in order to form a stopping surface configured for engagement with a surface of the auxiliary component 50 when the fitting 10 is in an assembled configuration. In the illustrated embodiment, the radial segment 31 is arranged perpendicular to the axial direction of the tube 20, but other transverse angles of less than 90 degrees may be utilized in forming the flanged portion 30 without necessarily departing from the scope of the present invention.

The flanged portion 30 of the embodiment of FIGS. 1-7 may be referred to as a barb flange due to the barb-like shape thereof. Such a barb flange may be utilized when the fitting 10 is configured for use with a female component of a VDA style end-form fitting assembly. However, as explained in greater detail hereinafter, other cross-sectional shapes may be utilized in forming the flanged portion 30 so long as the flanged portion 30 is shaped to cooperate with a complimentary feature of a corresponding female component 82 in releasable fashion.

Alternative cross-sectional shapes of the flanged portion 30 may include a substantially semi-circular shape or a substantially semi-elliptical shape if an annular bead is formed in the tube 20, such as is the case if the fitting 10 is configured for use with an SAE style end-form fitting assembly. As explained hereinafter, the flanged portion 30 may be configured to act as a part of a snap-fit type connection of a locking feature of the fitting assembly 80 having the fitting 10, wherein the tapering of the flanged portion 30 is critical to the formation of the snap-fit type connection when releasably coupling the fitting 10 to the female component 82. As such, the flanged portion 30 may have substantially any suitable cross-sectional shape where the flanged portion 30 first tapers radially outwardly before then tapering radially inwardly when continuing to progress in the rearward axial direction of the tube 20, wherein such tapering results in the formation of a substantially convex and circumferentially extending surface.

The deforming of the tube 20 may also include the introduction of a thickened portion 35 into the tube 20 disposed immediately rearward of the radial segment 31 of the flanged portion 30 at a position within the rear portion 28 of the tube 20. The thickened portion 35 includes the inner circumferential surface 25 of the tube 20 indented radially inwardly about a circumference of the tube 20 along a portion of the rear portion 28 disposed adjacent and intersecting a base of the radial segment 31. The thickened portion 35 includes a greater radial thickness than the remaining portions of the circumferential wall 21 disposed adjacent the thickened portion 35.

The auxiliary component 50 includes a collar 51, a pair of diametrically opposed orientation structures 52, and a pair of spacing blocks 53 with each of the spacing blocks 53 disposed to correspond to one of the orientation structures 52. The collar 51 is substantially cylindrical in shape and includes a substantially rectangular cross-sectional shape extended annularly around a periphery of the collar 51. The rectangular cross-sectional shape is formed by the cooperation of an inner circumferential surface 55, an outer circumferential surface 56 formed opposite the inner circumferential surface 55, a first or front end surface 57 facing in the forward axial direction, and a second or rear end surface 58 formed opposite the front end surface 57 and facing in the rearward direction. Each of the circumferential surfaces 55, 56 is substantially cylindrical in shape while each of the end surfaces 56, 57 is arranged transverse to the axial direction of the tube 20. Specifically, each of the end surfaces 56, 57 may be substantially planar in configuration with the planes defined thereby arranged perpendicular to the axial direction of the tube 20. In other embodiments, one or both of the end surfaces 56, 57 may be tapered, as desired.

Figure 5:
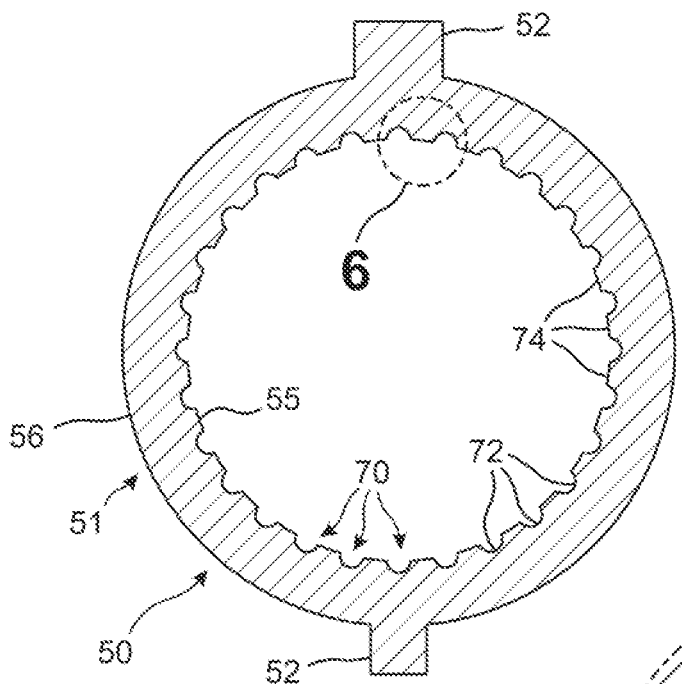
FIG. 5 is a cross-sectional view taken through the auxiliary component from the perspective of section lines 5-5 in FIG. 1.

Each of the orientation structures 52 is formed as a projection extending radially outwardly from the outer circumferential surface 56 of the collar 51. As best shown in FIG. 5, each of the orientation structures 52 may include a substantially rectangular cross-sectional shape when viewed from the axial direction of the auxiliary component 50, but alternative cross-sectional shapes may be utilized without departing from the scope of the present invention. In any event, the cross-sectional shape of each of the orientation structures 52 is selected to correspond to a cross-sectional shape of a corresponding orientation opening 85 projecting radially outwardly from a central aperture 84 formed through the female component 82 configured for use with the fitting 10 in forming the fitting assembly 80. The orientation structures 52 and the orientation openings 85 may be selected to include any complimentary profile shapes so long as the axial entry of the orientation structures 52 within the orientation openings 85 causes rotational interference for preventing rotation of the fitting 10 relative to the female component 82 when the fitting assembly 80 is in a coupled configuration.

Each of the spacing blocks 53 extends in the forward axial direction away from the front end surface 57 of the collar 51. A front end surface 58 of each of the spacing blocks 53 is spaced distally from the end surface 57 of the collar 51 and forms a stopping surface for preventing further axial movement of the auxiliary component 50 beyond the flanged portion 30 when the auxiliary component 50 is received over the tube 20, as explained in greater detail hereinafter when describing the method according to the present invention. Additionally, each of the spacing blocks 53 is further configured to space the front end surface 57 of the collar 51 a desired axial distance from the radial segment 31 of the flanged portion 30 when the front end surface 58 of each of the spacing blocks 53 is in contact with the radial segment 31.

Each of the spacing blocks 53 may further include a tapered surface 59 extending away from the corresponding front end surface 58 in the radial inward direction of the auxiliary component 50. Each of the tapered surfaces 59 may taper to include a decreasing radius with respect to the central axis of the auxiliary component 50 when progressing in the rearward axial direction of the auxiliary component 50.

Each of the orientation structures 52 may further include an overhang portion 62 extending in the forward axial direction beyond the front end surface 58 of each of the spacing blocks 53. The overhang portions 62 may extend forward axially beyond the tip 33 of the flanged portion 30 when the auxiliary component 50 is received over the tube 20 in order to position a leading surface of each of the orientation structures 52 closer to the front end 23 of the tube 20 when the fitting 10 is fully assembled. The leading surface of each of the orientation structures 52 may also be provided as a convex and arcuate surface 63 curving around an axis extending in the radial direction of the auxiliary component 50. Each of the arcuate surfaces 63 may be provided to act as a piloting feature of each of the orientation structures 52 when the orientation structures 52 are approaching the orientation openings 85 of the corresponding female component 82.

Although the auxiliary component 50 is shown and described as including a pair of the orientation structures 52 and a pair of the spacing blocks 53, it should be apparent that the auxiliary component 50 may be formed to include only one of the orientation structures 52 and one of the spacing blocks 53 while remaining within the scope of the present invention. Additionally, any number of the orientation features 52 and any number of the spacing blocks 53 may be disposed at circumferentially spaced intervals about a perimeter of the collar 51, wherein the same or different circumferential spaces may be present between adjacent ones of the orientations features 52 and corresponding spacing blocks 53. In the illustrated embodiment, each set of one of the orientation structures 52 and a corresponding one of the spacing blocks 53 includes substantially the same structure, but the opposing sets are depicted as having different circumferential widths from one another as depicted within FIGS. 1-7. This difference in widths between the opposing sets may be selected to ensure one specific rotational orientation of the fitting 10 when received within the female component 82. However, the fitting 10 may include each and all of the orientation structures 52 and spacing blocks 53 having identical structures to one another, as desired, without departing from the scope of the present invention.

The inner circumferential surface 55 of the collar 51 includes an annular array of surface irregularities 70 formed therein. As shown, the surface irregularities 70 are provided as axially extending splines forming a corrugated profile of the inner circumferential surface 55. However, it is understood other surface irregularities can be used such as a knurled surface, an array of spaced apart protuberances, and array of spaced apart indentations, as non-limiting examples.

Figure 6:
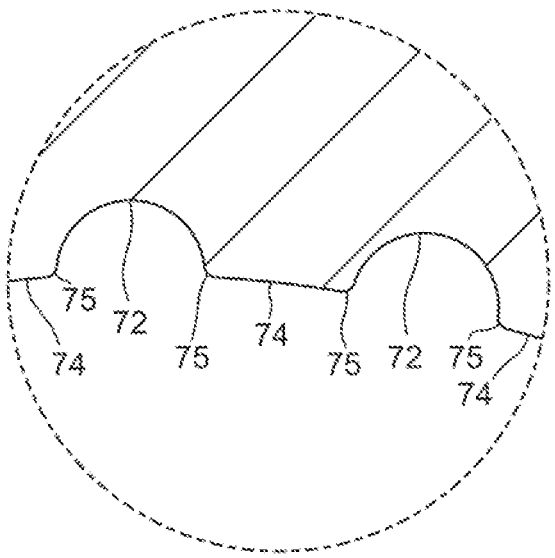
FIG. 6 is an enlarged fragmentary cross-sectional view of a portion of the auxiliary component surrounded by circle 6 in FIG. 5.

As best shown in FIGS. 5 and 6, the surface irregularities 70 may be provided as an annular array of indentations 72 formed in the inner circumferential surface 55 with each of the indentations 72 depressed in the radial outward direction of the auxiliary component 50. The indentations 72 are spaced circumferentially from one another at equal circumferential intervals to divide the inner circumferential surface 55 into a plurality of cylindrical surface segments 74 and the plurality of the indentations 72, wherein each of the cylindrical surface segments 74 is interposed between adjacent ones of the indentations 72. The indentations 72 and the cylindrical surface segments 74 each extend in the axial direction of the auxiliary component 50 from the front end surface 57 of the collar 51 to the rear end surface 58 thereof. The presence of each of the indentations 72 in the inner circumferential surface 55 results in each of the cylindrical surface segments 74 forming a radially inwardly extending spline configured for interaction with the tube 20 as explained in greater detail hereinafter.

Each of the cylindrical surface segments 74 has the shape of a segment of a cylindrical surface having a radius of curvature measured from the central axis of the auxiliary component 50 to cause the cylindrical surface segments 74 to cooperate to form a substantially cylindrical surface that is periodically interrupted by the presence of the plurality of the circumferentially spaced apart indentations 72. Each of the indentations 72 and each of the cylindrical surface segments 74 may extend the same distance with respect to the circumferential direction of the inner circumferential surface 55 such that the circumferential spacing present between adjacent ones of the indentations 72 is the same as the circumferential spacing present between adjacent ones of the cylindrical surface segments 74.

Each of the indentations 72 has a concave semi-circular shape indented into the inner circumferential surface 55. A transition surface 75 may be formed at each intersection of one of the indentations 72 with one of the cylindrical surface segments 74 to avoid the formation of sharp edges within the inner circumferential surface 55. Each of the transition surfaces 75 may be formed as a convex surface having a radius of curvature less than a radius of curvature of each of the concavely shaped indentations 72. For example, each of the indentations 72 may be provided to include a radius of curvature of about 0.5 mm while each of the transition surfaces 75 may be provided to include a radius of curvature of about 0.15 mm, as one non-limiting example. A similar ratio of the radius of curvature of each of the indentations 72 in comparison to a radius of curvature of each of the adjoining transition surfaces 75 may be selected if different dimensions are selected for forming each of the indentations 72, as desired.

In one embodiment, a number of the indentations 72 to be formed within the inner circumferential surface 55 for desired retention of the tube 20 within the auxiliary component 50 when the fitting 10 is assembled according to the method of the present invention may be determined according to the following equation:

$$N = \frac{C_1 + C_2 D - C_3 w}{2}$$

wherein N=the desired number of the indentations 72 formed in the inner circumferential surface 55, D=an inner diameter of the collar 51 as measured between diametrically opposing ones of the cylindrical surface segments 74, w=a width of the collar 51 as measured axially between the front end surface 57 and the rear end surface 58 thereof (which also corresponds to the axial dimension of each of the indentations 72 and the cylindrical surface segments 74 forming the surface irregularities 70), and $C_1$, $C_2$, and $C_3$ are each constant coefficients. The coefficient $C_1$ may be within the range of 20 to 25, the coefficient $C_2$ may be within the range of 0.5 to 0.9, and the coefficient $C_3$ may be within the range of 0.3 to 0.7. Favorable results have been obtained when $C_1$=23, $C_2$=0.7, and $C_3$=0.5. The number and corresponding structural configuration of each of the indentations 72 may be selected to cause the resulting connection between the tube 20 and the auxiliary component 50 to be cable of withstanding an applied torque that exceeds either the torque required to twist the tube 20 in raw form or 50 Nm, whichever is lower.

The method of manufacturing the fitting 10 according to the present invention is as follows. First, the tube 20 and the auxiliary component 50 are each independently formed into the configurations shown and described with reference to FIG. 1 hereinabove. The formation of the tube 20 into the disclosed configuration may first include the formation of a cylindrical section of tubing that is subsequently deformed to include the flanged portion 30 and the thickened portion 35 therein. The deformation may be performed via a suitable tube end-forming process utilizing hydraulic, electric, or even manual end-forming tooling, such as an end-forming punch die configured for introducing the described deformations into the tube 20. The described features may be formed in the tube 20 via a series of "punches" associated with the end-form tooling that progressively form the tube 20 into the desired configuration. The tube 20 may be formed from a rigid material such as a metallic material. Suitable metallic materials may include aluminum, various steel alloys, bronze, or copper, as non-limiting examples. The use of a metallic material may facilitate a volumetric single-direction end forming process that can be performed in a cold state without requiring additional heating of the component to be deformed. The tube 20 may alternatively be formed from an otherwise pliable polymeric material, such as a plastic material provided at a temperature or otherwise in a state suitable for plastically deforming the plastic material in the manner described herein.

The auxiliary component 50 may be formed in a die-casting or other molding process with the resulting auxiliary component 50 having the configuration shown and described herein. The auxiliary component 50 may be formed from a metallic material such as those described as being suitable for forming the tube 20. The auxiliary component 50 may alternatively be formed from a polymeric material such as a suitable plastic material, so long as the auxiliary component 50 is reinforced (such as by appropriate tooling) to withstand the forces required for performing the necessary deformation of the tube 20 towards the auxiliary component 50 without causing unnecessary damage to the auxiliary component 50.

As shown by the arrow in FIG. 1, the auxiliary component 50 is received over the rear end 24 of the tube 20 while moving in the forward axial direction according to another step of the method of assembling the fitting 10. The central opening of the auxiliary component 50 as defined by the inner circumferential surface 55 thereof includes a minimum inner diameter (as measured across diametrically opposing ones of the cylindrical surface segments 74) that is slightly greater than an outer diameter of the outer circumferential surface 26 of the tube 20 along the rear portion 28 of the tube 20 to allow for the axial reception of the auxiliary component 50 over the tube 20. The auxiliary component 50 is axially received over the tube 20 until the front end surface 58 of each of the spacing blocks 53 thereof makes contact with the radial segment 31 of the flanged portion 30. This configuration positions the thickened portion 35 of the tube 20 at the same axial position as the inner circumferential surface 55 of the collar 51 and hence each of the surface irregularities 70 formed therein.

Figure 2:
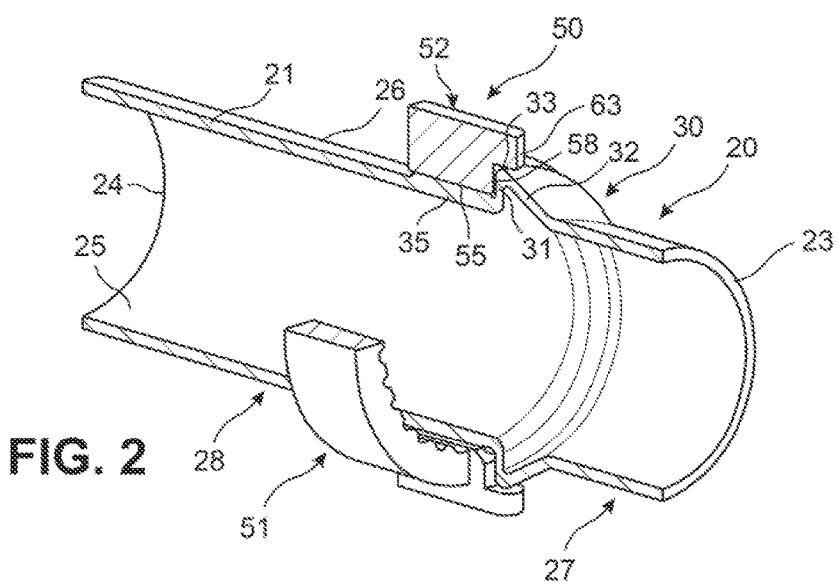
FIG. 2 is a partial cross-sectional perspective view showing the auxiliary component axially received over the tube, wherein the partial cross-sectional view includes half of the tube removed and one quadrant of the auxiliary component removed.

Next, as shown in FIG. 2, the method according to the present invention includes a step of deforming one of the tube 20 or the auxiliary component 50 towards the other of the tube 20 or the auxiliary component 50 to securely join the tube 20 to the auxiliary component 50. More specifically, in some embodiments the tube 20 may be expanded radially outwardly along the thickened portion 35 thereof towards the stationary inner circumferential surface 55 of the collar 51 defining the surface irregularities 70 while in other embodiments the collar 51 and the corresponding surface irregularities 70 formed therein may be compressed and contracted radially inwardly towards the outer circumferential surface 26 of the tube 20 along the thickened portion 35. If the radial outward expansion of the tube 20 is utilized, the process may be performed by a hydraulic, electric, or even manual (assuming suitable mechanical advantage) tube expansion mechanism. In contrast, if the radial inward compression of the auxiliary component 50 is utilized, the process may include a hydraulic, electric, or even manual (assuming suitable mechanical advantage) tube compression or staking mechanism.

The thickened portion 35 of the tube 20 is portrayed in FIG. 1 for use in the process including the outward expansion of the tube 20 towards the surface irregularities 70 formed in the auxiliary component 50. The radial inward indenting of the thickened portion 35 as shown in FIG. 1 provides the requisite material for deforming the circumferential wall 21 into the indentations 72 formed in the inner circumferential surface 55 of the collar 51 while maintaining a substantially constant cross-section of the inner circumferential surface 25 of the tube 20. For example, as can be seen by comparison between FIGS. 1 and 2, the radial inward indenting of the thickened portion 35 is replaced with a contrary configuration following the deforming step wherein the inner circumferential surface 26 of the tube 20 includes a constant inner diameter across the axial extension of the collar 51.

Figure 7:
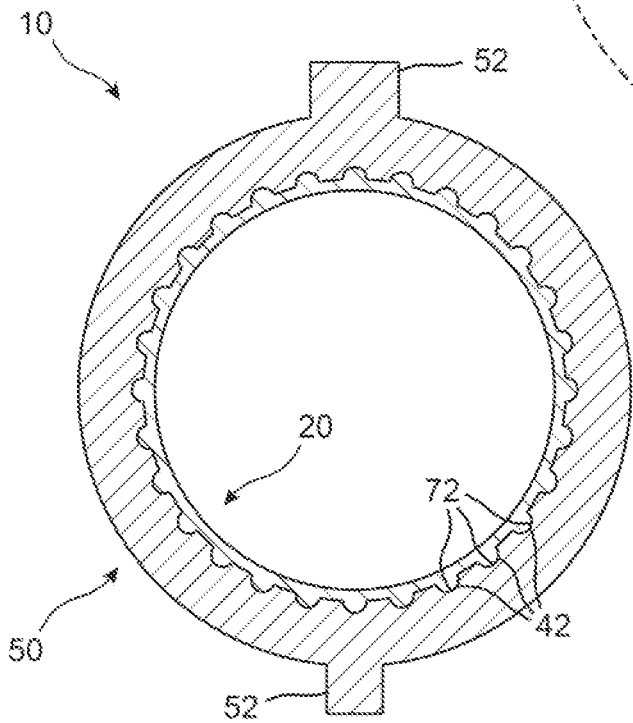
FIG. 7 is a cross-sectional view taken through the quick-connect end-form fitting from the perspective of section lines 7-7 in FIG. 4.

As can be seen in FIG. 7, the expansion of the tube 20 towards the collar 51 of the auxiliary component 50 results in the formation of a plurality of radial outwardly extending protuberances 42 within the tube 20 with each of the protuberances 42 extending into one of the indentations 72 formed in the collar 51. The corrugated (splined) joint formed between the tube 20 and the auxiliary component 50 forms a rotational inference feature for preventing rotation between the tube 20 and the auxiliary component 50. Additionally, the deforming of the tube 20 into the indentations 72 and the resultant pressing of the outer circumferential surface 26 of the tube 20 against the cylindrical surface segments 74 forms a frictional fit between the tube 20 and the auxiliary component 50 for preventing axial relative movement between the tube 20 and the auxiliary component 50. The same is true if the alternative process of deforming the auxiliary component 50 radially inwardly is utilized. In such a process, the cylindrical surface segments 74 may form radially inwardly extending splines or teeth that deform the outer circumferential surface 26 of the tube 20 radially inwardly to form the corrugated joint therebetween. In other embodiments, the surface irregularities 70 may be formed on the tube 20 with the auxiliary component 50 deformed to match the profile shape of the corrugated tube 20. In any event, any manufacturing process allowing for a radially directed force to be utilized to either deform the tube 20 radially outwardly towards the auxiliary component 50 or to deform the auxiliary component 50 radially inwardly towards the tube 20 for forming an interference and frictional press-fit connection therebetween may be suitable for use in joining the tube 20 and the auxiliary component 50 according to the method of the present invention.

Figure 3:
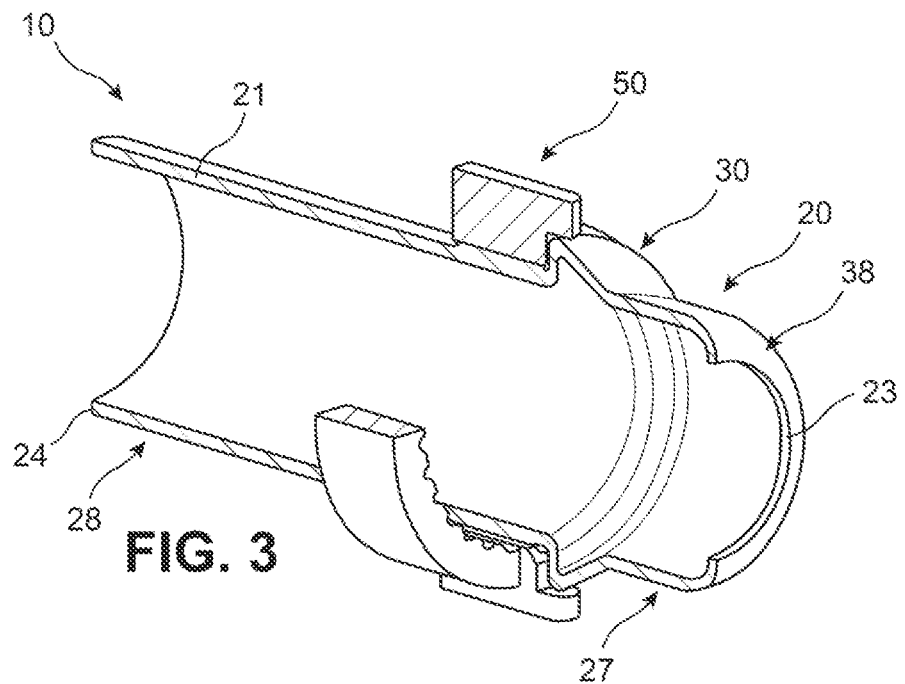
FIG. 3 is a partial cross-sectional perspective view showing a front end of the tube being deformed radially inwardly following a coupling of the auxiliary component to the tube, wherein the partial cross-sectional view includes half of the tube removed and one quadrant of the auxiliary component removed.

An additional step of the method may include deforming the front end 23 of the tube 20 to include a radially inwardly turned nose 38, as shown in FIG. 3. The end of the nose 38 defines a flow opening therethrough having a smaller inner diameter than the remainder of the inner circumferential surface 26 of the tube 20 due to the radial inward turning of the circumferential wall 21. The nose 38 may be provided as a piloting feature for more easily axially inserting the fitting 10 into the corresponding central aperture 84 of the female component 82.

Figure 4:
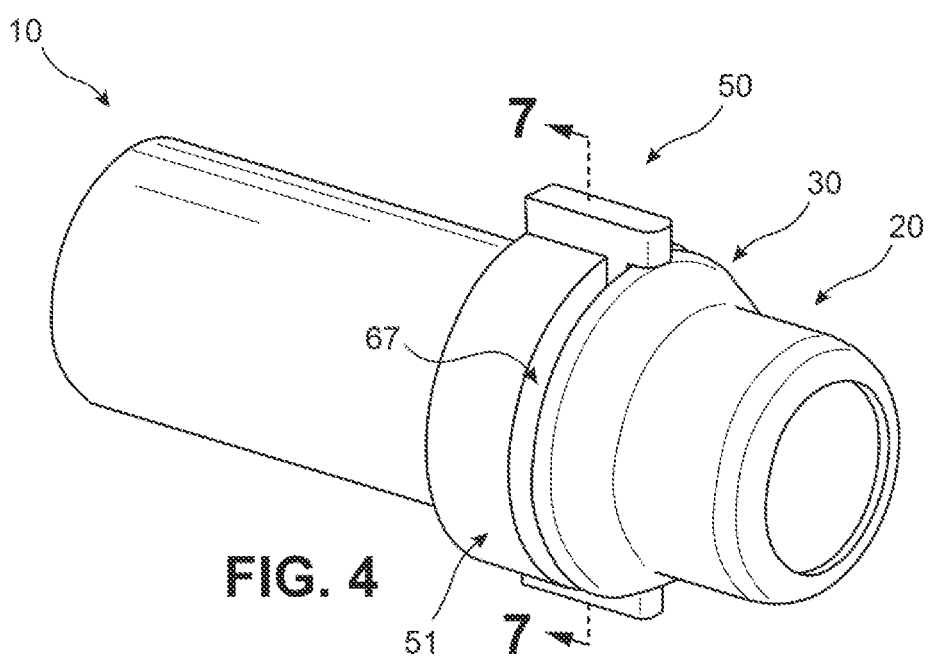
FIG. 4 is a perspective view illustrating the quick-connect end-form fitting as produced by the manufacturing process illustrated by reference to FIGS. 1-3.

As shown in FIG. 4, when in the fully assembled configuration thereof, the fitting 10 includes at least one locking groove 67 formed by the cooperation of the front end surface 57 of the collar 51, a portion of the outer circumferential surface 26 immediately rearward of the flanged portion 30, and the radial segment 31 of the flanged portion 30. In the present embodiment, the fitting 10 includes an opposing pair of the locking grooves 67 with each of the locking grooves 67 extending circumferentially about the fitting 10 between the opposing orientation structures 52.

Figure 8:
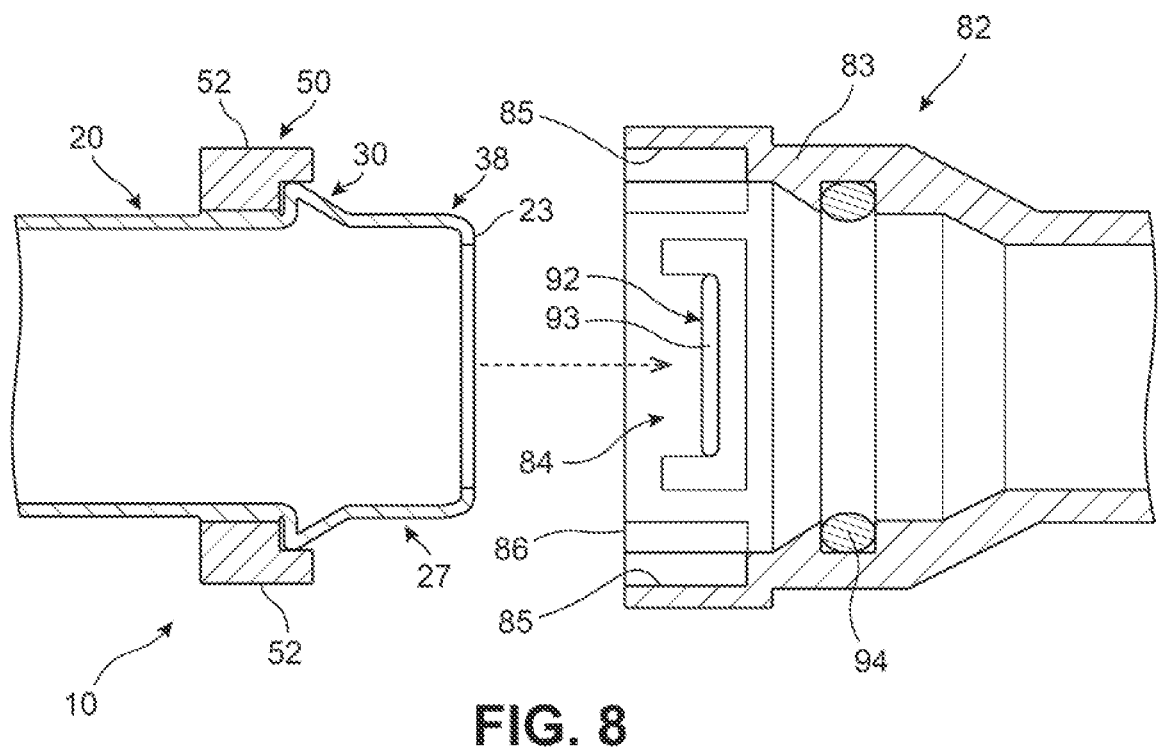
FIG. 8 is an exploded fragmentary cross-sectional view showing the quick-connect end-form fitting of FIG. 4 prior to coupling with a complimentary female component.
Figure 9:
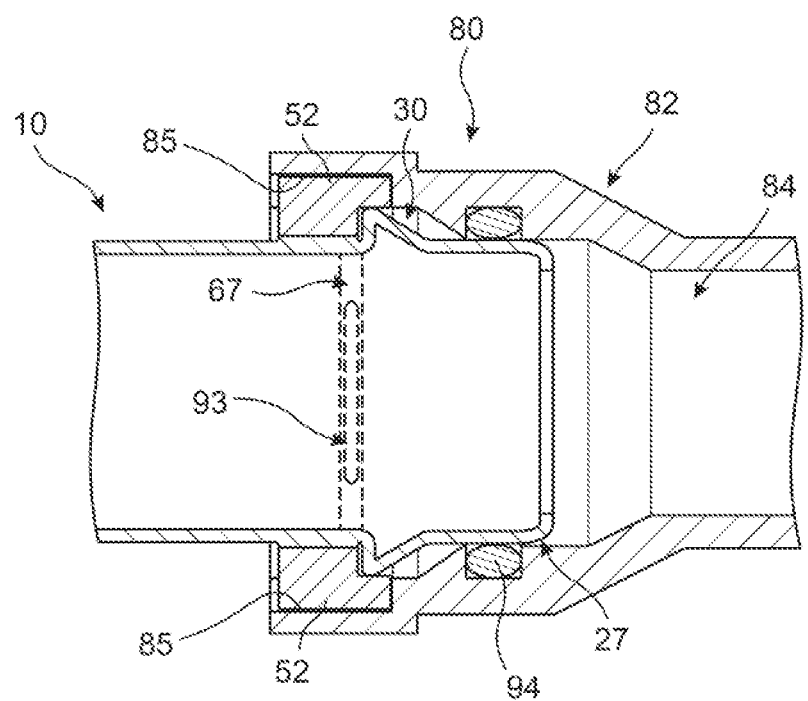
FIG. 9 is a cross-sectional view showing the quick-connect end-form fitting releasably coupled to the female component to form a fitting assembly according to an embodiment of the present invention.

Referring now to FIGS. 8 and 9, a method of use of the fitting 10 is disclosed with reference to a representative example of a female component 82 suitable for use with the fitting 10. The illustrated female component 82 is representative of a generic VDA style end-fitting having a snap-fit type connection as a locking feature thereof. In the embodiment shown, the female component 82 is formed from a plastic material, although it is understood other materials can be used without departing from the scope of the invention. Other related examples of the female component 82 are produced by the NORMA Group or ARaymond, as non-limiting examples. As mentioned previously, the structure of the fitting 10 may be adapted to correspond to alternative configurations of the female component 82 contrary to the VDA style end-form fitting, such as the SAE style end-form fitting or any other similar commercially available female component 82. One skilled in the art should appreciate that various different configurations of the female component 82 may be provided for use with the fitting 10 in addition to those shown and described herein, wherein the primary difference between such configurations relates to the different locking features utilized for interacting with the fitting 10.

The female component 82 is shown as including a housing 83 defining the central aperture 84 therethrough. The housing 83 further defines a pair of the orientation openings 85 at diametrically opposing sides of the central aperture 84. Each of the orientation openings 85 may be provided as a slot extending axially into the housing 83 from an axial end 86 of the female component 82. The axial end 86 of the female component 82 includes an opening formed by the cooperation of the central aperture 84 and the pair of the orientation openings 85 that has a profile shape that substantially corresponds in shape and dimension to the profile shape of the fitting 10 as depicted in FIG. 7.

A pair of female locking features 92 is provided along an inner circumferential surface of the housing 83 defining the central aperture 84 thereof with the locking features 92 arranged diametrically opposite each other. In the illustrated embodiment, each of the locking features 92 is depicted as a resiliently flexible tab projecting radially inwardly towards a central axis of the central aperture 84 and having a distal edge 93 forming a radially innermost surface of the tab. However, the female component 82 may include any contrary structure for forming a releasable connection between the fitting 10 and the female component 82 while remaining within the scope of the present invention. For example, the other above mentioned examples of the VDA style end-form fittings instead utilize a clip or pin that similarly experiences a spring force or resilient force for returning the clip or pin to an original position thereof following passage of the clip or pin past the flanged portion 30 of the tube 20 to releasably couple the fitting 10 to the female component 82.

The female component 82 further includes an O-ring 94 disposed axially within the central aperture 84 beyond the female locking features 92 and the orientation openings 85. The O-ring 94 is configured to engage the front end portion 27 of the tube 20 when the fitting 10 and the female component 82 are coupled to one another to form the fitting assembly 80.

As shown by comparison of FIGS. 8 and 9, the front end 23 of the tube 20 is first introduced into the central aperture 84 with the fitting 10 rotationally oriented such that the orientation structures 52 are axially aligned with each of the orientation openings 85. Once so oriented, the fitting 10 can continue to be moved in the forward axial direction thereof until the tapered segment 32 of the flanged portion 30 initially engages the distal edge 93 of each of the female locking features 92. Continued forward progression of the fitting 10 into the female component 82 causes the resiliently flexible tabs forming the female locking features 92 to flex radially outwardly as the tabs progress over the tapered segment 32 until the distal edge 93 of each of the tabs can resiliently snap back towards the original configuration thereof once the distal edge 93 has passed beyond the tip 33 of the flanged portion 30. The distal edge 93 of each of the female locking features 92 may snap back in the radial inward direction to be received within one of the locking grooves 67, thereby preventing undesired axial movement of the fitting 10 relative to the female component 82. The axial motion of the female locking features 92 to a position beyond the flanged portion 30 of the tube 20 also results in the front portion 27 of the tube 20 sealingly engaging the O-ring 94 to form the fluid tight seal between the fitting 10 and the female component 82 due to the slight compression of the O-ring 94 in the radial outward direction thereof.

The structure of the fitting 10 beneficially allows for the proper rotational orientation of the fitting 10 to be established relative to the corresponding female component 82 via the use of the orientation structures 52. Additionally, the disclosed method of manufacturing the fitting 10 is relatively simple, cost effective, and scalable, thereby improving upon previous methods of forming end fittings suitable for use with female end fitting configurations such as the previously mentioned VDA and SAE style configurations.

Referring now to FIGS. 10-13, a method of manufacturing a quick-connect end-form fitting 110 according to another embodiment of the present invention is disclosed. The fitting 110 is substantially similar in many respects to the fitting 10 and operates in substantially the same manner when interacting with the female component 82 of the corresponding fitting assembly 80. Those features or components of the fitting 110 that are similar in form and function to those of the fitting 10 are denoted by reference numerals derived by adding 100 to the corresponding reference numeral directed towards the fitting 10. For example, the fitting 110 comprises a tube 120 (corresponding to tube 20) and an auxiliary component 150 (corresponding to auxiliary component 50). Due to the similarities present between the fittings 10, 110, discussion of the fitting 110 is predominantly focused on the distinctions present between the fittings 10, 110 that result in modifications to the method of manufacturing the fitting 110 in comparison to the method of manufacturing the fitting 10.

Figure 10:
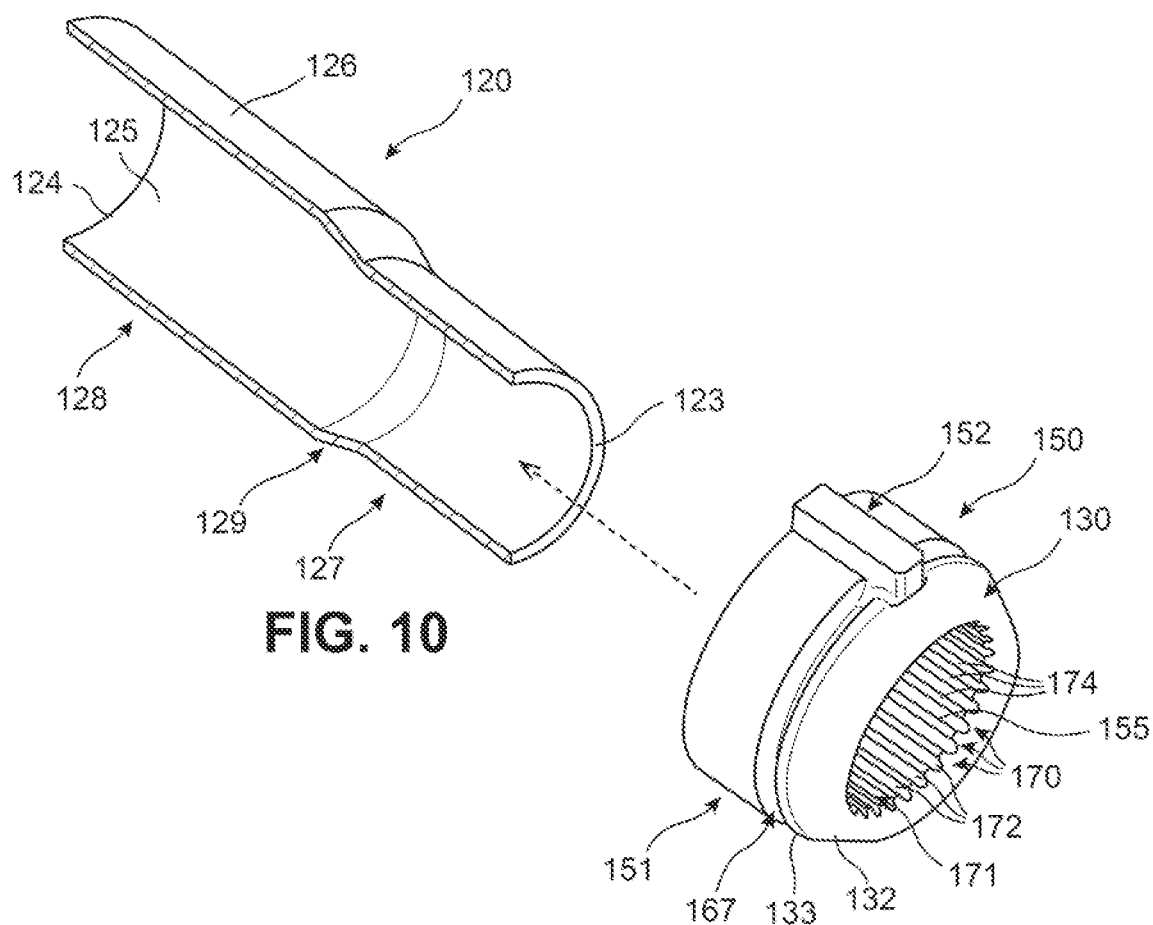
FIG. 10 is an exploded and partial cross-sectional perspective view of a tube and an axially spaced apart auxiliary component utilized in forming a quick-connect end-form fitting according to another embodiment of the present invention, wherein the partial cross-sectional view includes half of the tube removed to illustrate an interior thereof.

As shown in FIG. 10, the tube 120 extends longitudinally and axially from a first or front end 123 to an opposing second or rear end 124. The tube 120 is provided or otherwise formed to include a front portion 127 having a first inner diameter, a rear portion 128 having a second inner diameter greater than the first inner diameter, and a transition portion 129 connecting the front portion 127 to the rear portion 128. The transition portion 129 is tapered to have a constantly decreasing inner diameter when progressing in the forward axial direction of the fitting 110, thereby resulting in the transition portion 129 having a truncated frusto-conical shape.

The auxiliary component 150 is formed from a unitary structure formed to include an annular collar 151, a pair of the orientation structures 152 projecting radially outwardly from the collar 151, and a flanged portion 130 formed monolithically with the collar 151. The flanged portion 130 includes a tapered surface 132 having a progressively increasing diameter towards a tip 133 of the flanged portion 130. A locking groove 167 is indented radially inwardly into an outer circumferential surface of the auxiliary component 150 at a division of the auxiliary component 150 into the collar 151 and the flanged portion 130 thereof.

An inner circumferential surface 155 of the auxiliary component 150 includes a plurality of the surface irregularities 170 in similar fashion to the auxiliary component 150. However, the inner circumferential surface 155 is divided axially into an engaging portion 171 and an annularly extending inclined surface 177. The engaging portion 171 is generally arranged parallel to the axial direction of the fitting 110 and includes the surface irregularities 170 formed therein. The inclined surface 177 extends rearwardly from the engaging portion 171 and is tapered to have an increasing inner diameter when progressing in the rearward axial direction of the fitting 110 away from the engaging portion 171.

The surface irregularities 170 formed in the engaging portion 171 are once again provided as an alternating pattern of cylindrical surface segments 174 and indentations 172. A number of the indentations 172 formed in the engaging portion 171 of the inner circumferential surface 155 may once again be determined by the previously disclosed equation, although the variable w may be representative of the axial dimension of the engaging portion 171 corresponding to the axial length of each of the indentations 172 and each of the cylindrical surface segments 174 due to the surface irregularities 170 not extending across an entirety of the inner circumferential surface 155 by virtue of the presence of the inclined surface 177.

Each of the orientation structures 152 is substantially similar to one of the previously disclosed orientation structures 52 except each of the orientation structures extends axially to merge with each of the flanged portion 130 and the collar 151 of the auxiliary component 150.

A method of manufacturing the fitting 110 is as follows. First, the tube 120 and the auxiliary component 150 are provided in the configurations shown and described with reference to FIG. 10. The tube 120 may be deformed from a purely cylindrical tube to the configuration of FIG. 10 including the transition portion 129 using the same tube forming processes and mechanisms described as suitable in initially deforming the tube 20. The auxiliary component 150 may also be manufactured using the same processes and mechanisms described as suitable in forming the auxiliary component 150. The tube 120 and the auxiliary component 150 may each be formed from the same materials described as suitable for forming the tube 20 and the auxiliary component 50.

Figure 11:
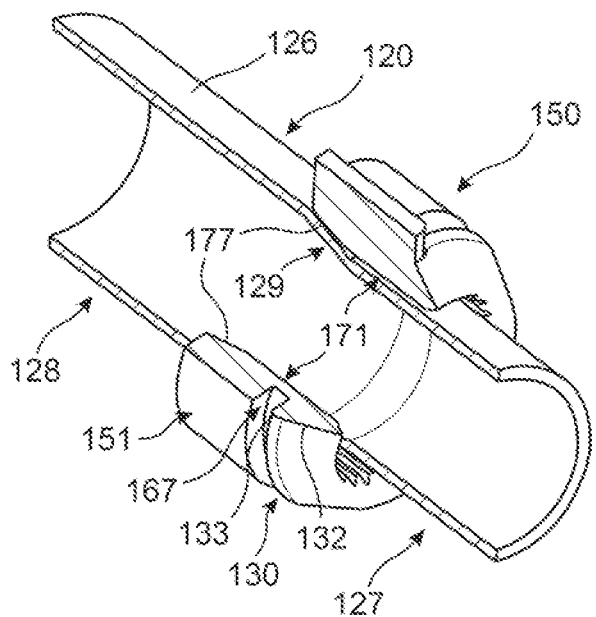
FIG. 11 is a partial cross-sectional perspective view showing the auxiliary component axially received over the tube, wherein the partial cross-sectional view includes half of the tube removed and one quadrant of the auxiliary component removed.

Once provided in the configurations disclosed in FIG. 10, the auxiliary component 150 is received over the front end 123 of the tube 120 and is moved in the rearward axial direction until the tapered inclined surface 177 makes contact with the correspondingly tapered transition portion 129 of the tube 120. The transition portion 129 accordingly forms a stopping surface for establishing an axial position of the auxiliary component 150 relative to the tube 120. As shown in FIG. 11, the engaging portion 171 of the inner circumferential surface 155 is thus positioned to face towards the front portion 127 of the tube 120 immediately adjacent the transition portion 129.

The deforming step is then performed with respect to one of the tube 120 or the auxiliary component 150 to form the corrugated joint therebetween as described in reference to the fitting 10. The deforming step may include expanding the tube 120 radially outwardly towards the auxiliary component 150 using any of the processes described as suitable for expanding the tube 20 or the auxiliary component 150 may be compressed radially inwardly towards the tube 120 using any of the processes described as suitable for compressing the auxiliary component 50.

Figure 12:
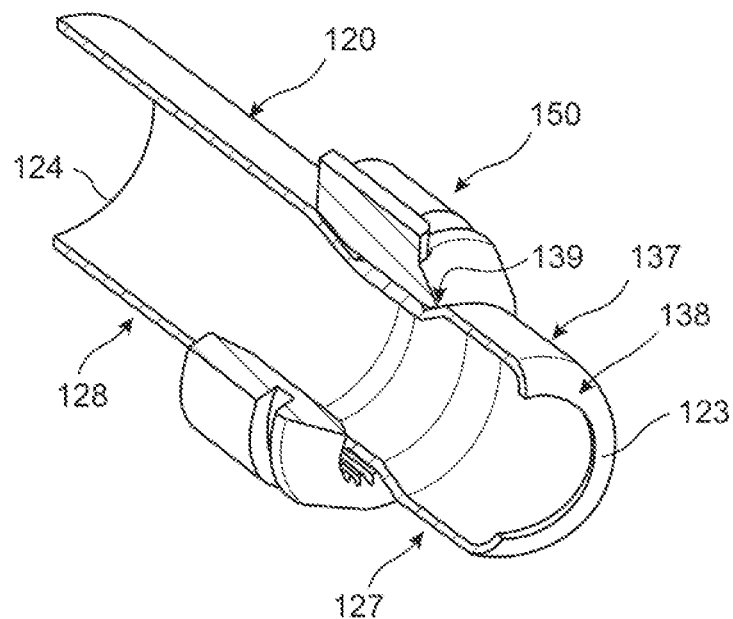
FIG. 12 is a partial cross-sectional perspective view showing a front end portion of the tube being deformed following a coupling of the auxiliary component to the tube, wherein the partial cross-sectional view includes half of the tube removed and one quadrant of the auxiliary component removed.

The method of manufacturing the fitting 110 further includes a step of deforming the front portion 127 of the tube 120 from the configuration thereof as shown in FIG. 11 to the configuration thereof as shown in FIG. 12. Specifically, the previously smaller diameter front portion 127 of the tube 120 is expanded radially outwardly to match the diameter of the rear portion 128 along a cylindrical segment 137 of the front portion 127. Additionally, the front end 123 of the tube 120 is also turned radially inwardly to form a nose 138 of the tube 120 while the outward expansion of the cylindrical segment 137 results in the formation of a tapered segment 139 where the tube 120 engages a front edge of the flanged portion 130 of the auxiliary component 150.

Figure 13:
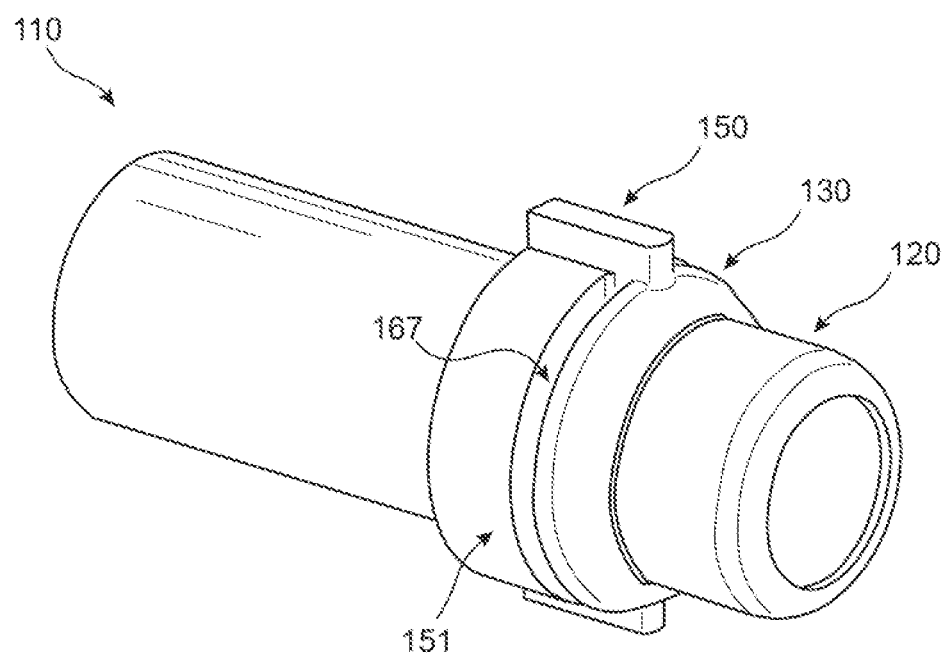
FIG. 13 is a perspective view illustrating the quick-connect end-form fitting as produced by the manufacturing process illustrated by reference to FIGS. 10-12.
Figure 14:
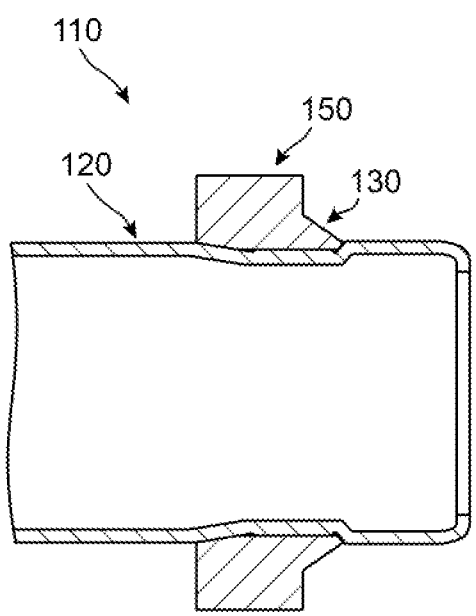
FIG. 14 is a fragmentary cross-sectional view of the quick-connect end-form fitting of FIG. 13 taken through a central plane thereof.

FIGS. 13 and 14 illustrate the fitting 110 in its final form. As should be apparent from a comparison between FIGS. 4 and 13 and FIGS. 8 and 14, the fitting 110 includes substantially similar structure to the fitting 10 except the flanged portion 130 of the fitting 110 is incorporated into the structure of the auxiliary component 150 rather than the tube 120. The locking grooves 167 are also formed exclusively within the auxiliary component 150 rather than being formed between corresponding surfaces of the tube 20 and the auxiliary component 50. The substantially identical external structure of the fitting 110 in comparison to the fitting 10 results in the fitting 110 operating in substantially identical fashion as the fitting 10, hence a description and illustration of a method of use of the fitting 110 is omitted herefrom.

The method of manufacturing the fitting 110 according to FIGS. 10-13 may beneficially allow for the tube 120 to be fixed in position (clamped) a single time while each of the disclosed processes are carried out on the tube 120. For example, a mounting of the tube 120 at the rear end 124 thereof allows for the formation of the front, rear, and transition portions 127, 128, 129 of the tube 120, the reception of the auxiliary component 150 over the tube 120 in the rearward axial direction, the locking of the auxiliary component 150 to the tube 120, and the subsequent deforming of the front portion 127 of the tube 120 to the finalized configuration thereof without having to reposition or reorient the tube 120 because all such operations can be performed by approaching the front end 123 of the tube 120.

By employing the end-form fittings 10, 110, installation and assembly errors are minimized, thereby eliminating the issues identified herein with respect to the prior art. Thus, efficiency is optimized and costs are minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An end-form fitting comprising:
   a tube; and
   an auxiliary component disposed around the tube, wherein an inner circumferential surface of the auxiliary component includes an annularly extending inclined surface, wherein one of the tube or the auxiliary component is deformed to couple the auxiliary component to the tube, wherein the tube includes a small diameter portion, a large diameter portion, and a transition portion having a taper to connect the small diameter portion to the large diameter portion, wherein the inclined surface of the auxiliary component abuts the transition portion of the tube before deformation of the one of the tube or the auxiliary component to couple the auxiliary component to the tube, and wherein the tube is deformed radially outwardly to engage at least one surface irregularity formed in the inner circumferential surface of the auxiliary component.

2. The end-form fitting according to claim 1, wherein the auxiliary component includes an orientation structure.

3. The end-form fitting of claim 2, wherein the auxiliary component includes an annular collar configured to surround the tube, and wherein the orientation structure projects radially outwardly from the collar.

4. The end-form fitting of claim 1, wherein a corrugated joint is present wherein the auxiliary component engages the tube.

5. The end-form fitting of claim 1, wherein when the one of the tube or the auxiliary component is deformed, a frictional connection is formed between the tube and the auxiliary component for affixing the auxiliary component to the tube.

6. An end-form fitting comprising:
   a tube; and an auxiliary component disposed around the tube, wherein an inner circumferential surface of the auxiliary component includes an annularly extending inclined surface, wherein one of the tube or the auxiliary component is deformed to couple the auxiliary component to the tube, wherein the tube includes a small diameter portion, a large diameter portion, and a transition portion having a taper to connect the small diameter portion to the large diameter portion, wherein the inclined surface of the auxiliary component abuts the transition portion of the tube before deformation of the one of the tube or the auxiliary component to couple the auxiliary component to the tube, wherein the auxiliary component includes an annular collar configured to surround the tube, a flanged portion spaced axially from the collar, and a locking groove formed between the collar and the flanged portion.

7. An end-form fitting comprising:

a tube; and an auxiliary component disposed around the tube, wherein an inner circumferential surface of the auxiliary component includes an annularly extending inclined surface, wherein one of the tube or the auxiliary component is deformed to couple the auxiliary component to the tube, wherein the tube includes a small diameter portion, a large diameter portion, and a transition portion having a taper to connect the small diameter portion to the large diameter portion, wherein the inclined surface of the auxiliary component abuts the transition portion of the tube before deformation of the one of the tube or the auxiliary component to couple the auxiliary component to the tube, and wherein a plurality of splines is formed on the inner circumferential surface of the auxiliary component.

8. A method of manufacturing an end-form fitting comprising the steps of:

forming a tube to include a small diameter portion, a large diameter portion, and a transition portion having a taper to connect the small diameter portion to the large diameter portion;

positioning an annular auxiliary component around the tube, wherein an inner circumferential surface of the auxiliary component includes an annularly extending inclined surface, and the auxiliary component is moved axially relative to the tube until the annularly extending inclined surface of the auxiliary component abuts the transition portion of the tube before deformation of one of the tube or the auxiliary component to couple the auxiliary component to the tube; and deforming the one of the tube or the auxiliary component to couple the auxiliary component to the tube, wherein the deforming step includes expanding the tube radially outwardly towards the auxiliary component.

9. A method of manufacturing an end-form fitting comprising the steps of:

forming a tube to include a small diameter portion, a large diameter portion, and a transition portion having a taper to connect the small diameter portion to the large diameter portion;

positioning an annular auxiliary component around the tube, wherein an inner circumferential surface of the auxiliary component includes an annularly extending inclined surface, and the auxiliary component is moved axially relative to the tube until the annularly extending inclined surface of the auxiliary component abuts the transition portion of the tube before deformation of one of the tube or the auxiliary component to couple the auxiliary component to the tube; and deforming the one of the tube or the auxiliary component to couple the auxiliary component to the tube, wherein the inner circumferential surface of the auxiliary component includes an array of surface irregularities configured to engage the tube during the deforming step.

10. The method of claim 9, wherein the surface irregularities are provided as an annular array of radially outwardly extending indentations formed in the inner circumferential surface of the auxiliary component.

11. The method of claim 10, wherein the deforming step includes an outer circumferential surface of the tube being deformed into the indentations of the auxiliary component to form a corrugated joint between the auxiliary component and the tube.

12. An end-form fitting comprising:

a tube; and an auxiliary component disposed around the tube, wherein an inner circumferential surface of the auxiliary component includes an annularly extending inclined surface and an array of surface irregularities, wherein one of the tube or the auxiliary component is deformed to cause the surface irregularities of the auxiliary component to engage the tube, wherein the tube includes a small diameter portion, a large diameter portion, and a transition portion having a taper to connect the small diameter portion to the large diameter portion, and wherein the transition portion of the tube forms a stopping surface for establishing an axial position of the auxiliary component relative to the tube before the one of the tube or the auxiliary component is deformed.

* * * * *